United States Patent
Sato

(10) Patent No.: US 9,329,197 B2
(45) Date of Patent: May 3, 2016

(54) METHOD AND APPARATUS FOR IMPROVED ACCURACY OF STATIC PRESSURE MEASUREMENT USING PRESSURE TAPS

(71) Applicant: The Boeing Company, Chicago, IL (US)

(72) Inventor: Sho Sato, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 114 days.

(21) Appl. No.: 14/220,811

(22) Filed: Mar. 20, 2014

(65) Prior Publication Data

US 2015/0268074 A1   Sep. 24, 2015

(51) Int. Cl.
G01P 5/14 (2006.01)
G01F 1/46 (2006.01)
G01L 1/00 (2006.01)
G01P 13/02 (2006.01)

(52) U.S. Cl.
CPC ... G01P 5/14 (2013.01); G01L 1/00 (2013.01); G01P 13/025 (2013.01)

(58) Field of Classification Search
None
See application file for complete search history.

(56) References Cited

U.S. PATENT DOCUMENTS

| | | | | |
|---|---|---|---|---|
| 4,717,159 A * | 1/1988 | Alston | ............ | G01F 15/185 73/861.65 |
| 7,480,548 B2 * | 1/2009 | Shigemi | ............ | G01C 5/005 73/861.65 |
| 2003/0010130 A1 * | 1/2003 | Bachinski | ............ | G01P 5/165 73/747 |
| 2006/0178790 A1 * | 8/2006 | Shigemi | ............ | G01C 5/005 701/7 |

OTHER PUBLICATIONS

Rayle, "Influence of Orifice Geometry on Static Pressure Measurements," The American Society of Mechanical Engineers, Paper No. 59-A-234, Nov. 1959, pp. 1-4.
Tropea et al., "Pressure Measurement Systems," Springer, Springer Handbook of Experimental Fluid Mechanics, Part B.4, copyright 2007, pp. 179-214.
Heeley, "Understanding Pressure and Pressure Measurement," Freescale Semiconductor, Inc., Application Note, Paper No. AN1573, Revision 1, May 2005, 6 pages.

* cited by examiner

*Primary Examiner* — Harshad R Patel
(74) *Attorney, Agent, or Firm* — Yee & Associates, P.C.

(57) ABSTRACT

A method and apparatus for measuring static pressure. A tube is positioned within a hole in a structure. The hole has a hole diameter that is larger than a tube diameter of the tube such that a gap is formed between the tube and the hole. A first portion of deflected fluid that is deflected from a flow of fluid passing over the hole enters the gap and a second portion of the deflected fluid enters the tube. The static pressure of the fluid is measured at a location of the hole with the tube positioned within the hole.

20 Claims, 6 Drawing Sheets

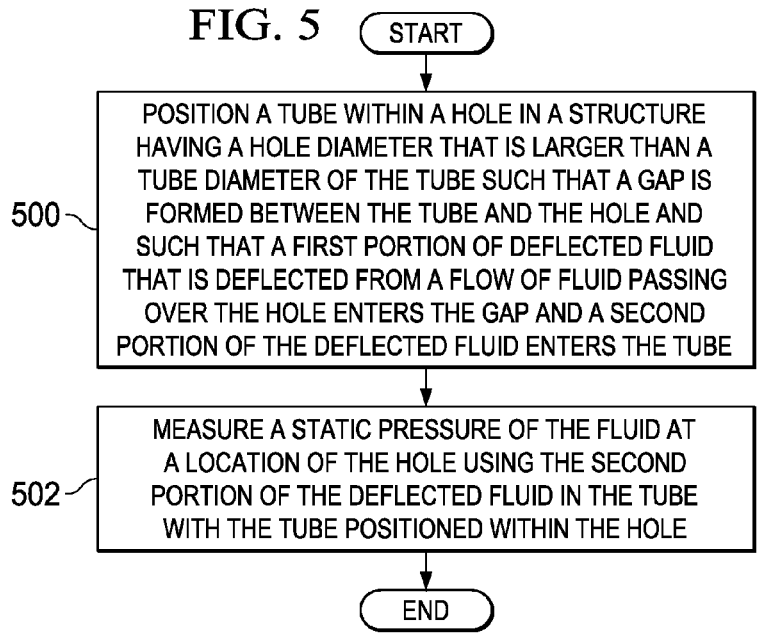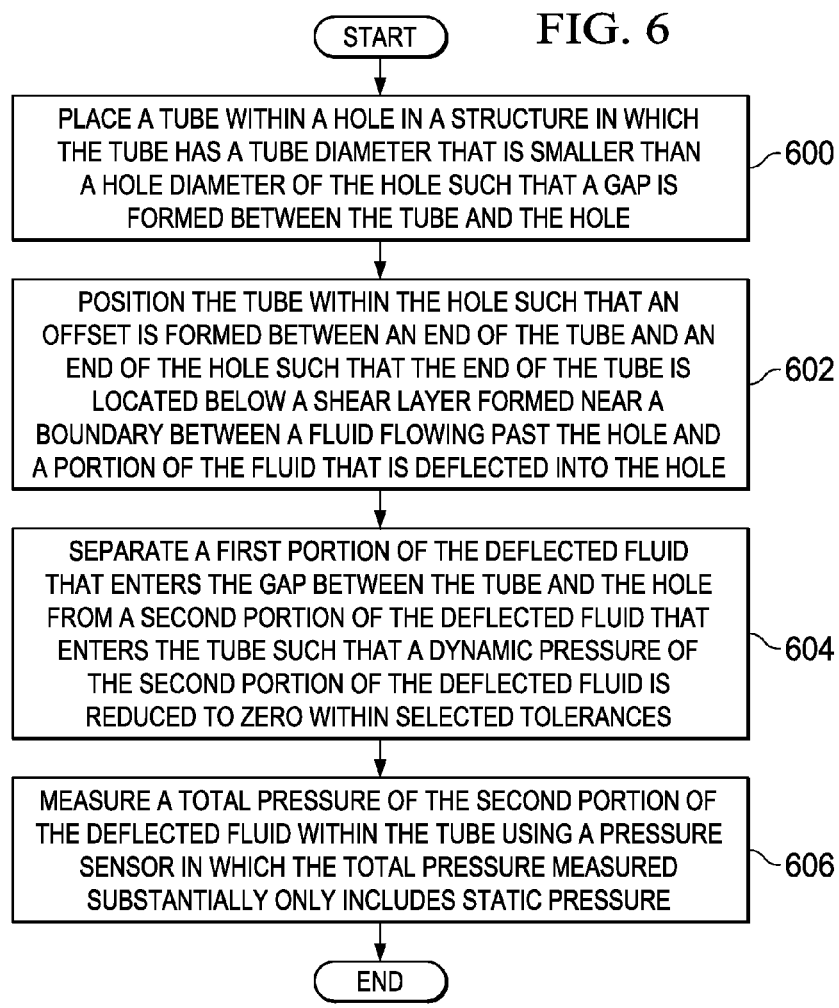

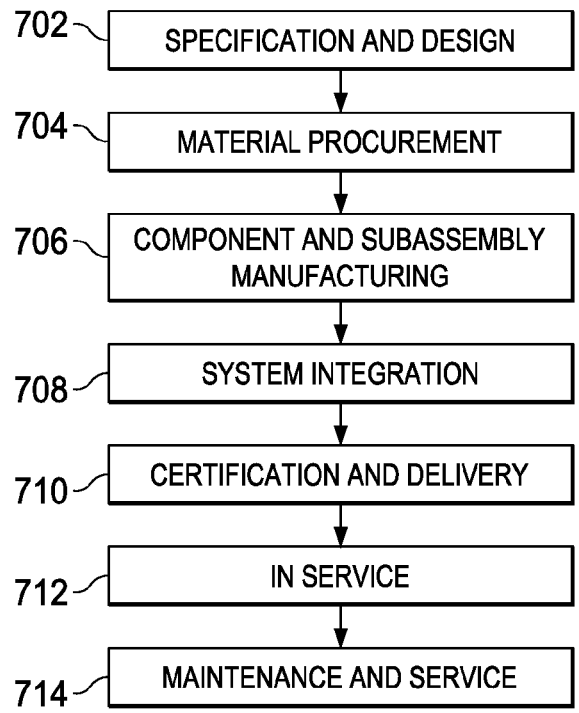
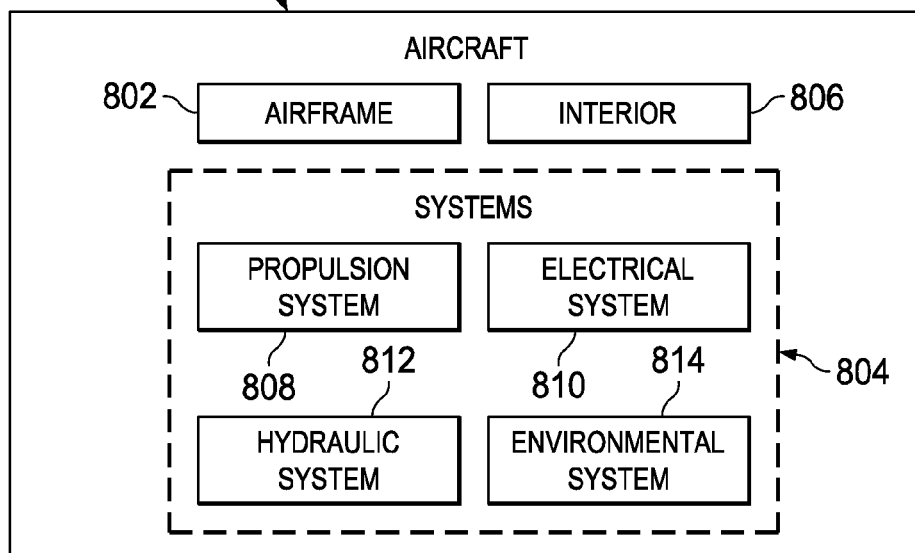

US 9,329,197 B2

METHOD AND APPARATUS FOR IMPROVED ACCURACY OF STATIC PRESSURE MEASUREMENT USING PRESSURE TAPS

BACKGROUND INFORMATION

1. Field

The present disclosure relates generally to measuring pressure and, in particular, to measuring static pressure. Still more particularly, the present disclosure relates to a method and apparatus for improving the accuracy of static pressure measurements made using pressure taps.

2. Background

Fluid pressure is a measure of the force per unit area exerted by a fluid. The fluid may be comprised of a gas, a liquid, or a combination of the two. There are two types of fluid systems: static systems and dynamic systems. In a static system, the fluid is at rest and not moving. In a dynamic system, the fluid is moving.

In dynamic systems, fluid pressure may be expressed using three different types of pressures: static pressure, dynamic pressure, and total pressure. The static pressure of a fluid is a representation of non-directional molecular motion. Further, the static pressure of a fluid is independent of the movement of a fluid and acts equally in all directions. Dynamic pressure is generated by movement of the fluid. In particular, dynamic pressure is the kinetic energy per unit volume of a fluid particle. In other words, dynamic pressure is the portion of fluid pressure that represents the kinetic energy of a fluid. Total pressure is the sum of the static pressure and the dynamic pressure of a fluid.

Oftentimes, the static pressure of a fluid in a dynamic system is measured using pressure taps. For example, the static pressure of a fluid flowing within a fluid duct may be measured using a pressure tap located in the wall of the fluid duct. The pressure tap is typically created as a hole in the wall of the fluid duct. The location and angle of the pressure tap relative to the wall of the fluid duct is selected to reduce the effect of the flow of the fluid through the fluid duct on the static pressure measurement.

A pressure sensor may be connected to the pressure tap using, for example, a hose or tube. The pressure measured by the pressure sensor is a measurement of the static pressure of the fluid at the location of the pressure tap. However, this measurement may include bias. In other words, the measurement may not represent the true static pressure of the fluid at that location. The bias may be due to, for example, the undesired inclusion of dynamic pressure in the measurement.

Some currently available methods for reducing this bias include changing a size or shape of the pressure tap, removing burrs around the edges of the pressure tap, or moving the pressure tap to a location where the flow of the fluid has a reduced velocity. Other currently available methods may adjust for the bias after the measurements have been made.

However, these solutions may not increase the accuracy of the measurements as much as desired, may be more time-consuming than desired, may be more expensive than desired, may be more complex than desired, or some combination thereof. Therefore, it would be desirable to have a method and apparatus that take into account at least some of the issues discussed above, as well as other possible issues.

SUMMARY

In one illustrative embodiment, a method for measuring static pressure is provided. A tube is positioned within a hole in a structure. The hole has a hole diameter that is larger than a tube diameter of the tube such that a gap is formed between the tube and the hole. A first portion of deflected fluid that is deflected from a flow of fluid passing over the hole enters the gap and a second portion of the deflected fluid enters the tube. The static pressure of the fluid at a location of the hole is measured with the tube positioned within the hole.

In another illustrative embodiment, a pressure measurement system comprises a tube and a pressure sensor associated with the tube. The tube has a tube diameter that is smaller than a hole diameter of a hole in a structure such that a gap is formed between the tube and the hole when the tube is positioned within the hole. The pressure sensor is configured to measure a static pressure of a fluid flowing across the structure at a location of the hole.

In yet another illustrative embodiment, an apparatus comprises a tube. The tube has a tube diameter that is smaller than a hole diameter of a hole in a structure such that a gap is formed between the tube and the hole when the tube is positioned within the hole. The tube comprises a first end that is to be positioned offset from an end of the hole and a second end associated with a pressure sensor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a process for measuring static pressure in the form of a flowchart in accordance with an illustrative embodiment;

FIG. 6 is an illustration of a process for measuring static pressure in the form of a flowchart in accordance with an illustrative embodiment;

FIG. 7 is an illustration of an aircraft manufacturing and service method in the form of a block diagram in accordance with an illustrative embodiment; and FIG. 8 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a method and apparatus for measuring the static pressure of a fluid in a dynamic system that increases the accuracy of the measurements made. In particular, the illustrative embodiments recognize and take into account that it may be desirable to have a method and apparatus for measuring static pressure that increases the accuracy of the measurements made, while being simpler, more cost-effective, less time-consuming, or some combination thereof, than some currently available solutions.

Thus, the illustrative embodiments provide a pressure measurement system for measuring static pressure. In one illustrative embodiment, the pressure measurement system includes a tube and a pressure sensor. The tube is positioned within a hole in a structure in which the hole has a larger diameter than the tube such that a gap is formed between the tube and the hole. Further, the tube is positioned such that an end of the tube is offset from an end of the hole. The pressure sensor is associated with the tube and is configured to measure a static pressure of a fluid flowing past the hole. Error in the measurement of the static pressure is reduced to zero within selected tolerances using this configuration for the pressure measurement system.

Figure 1:
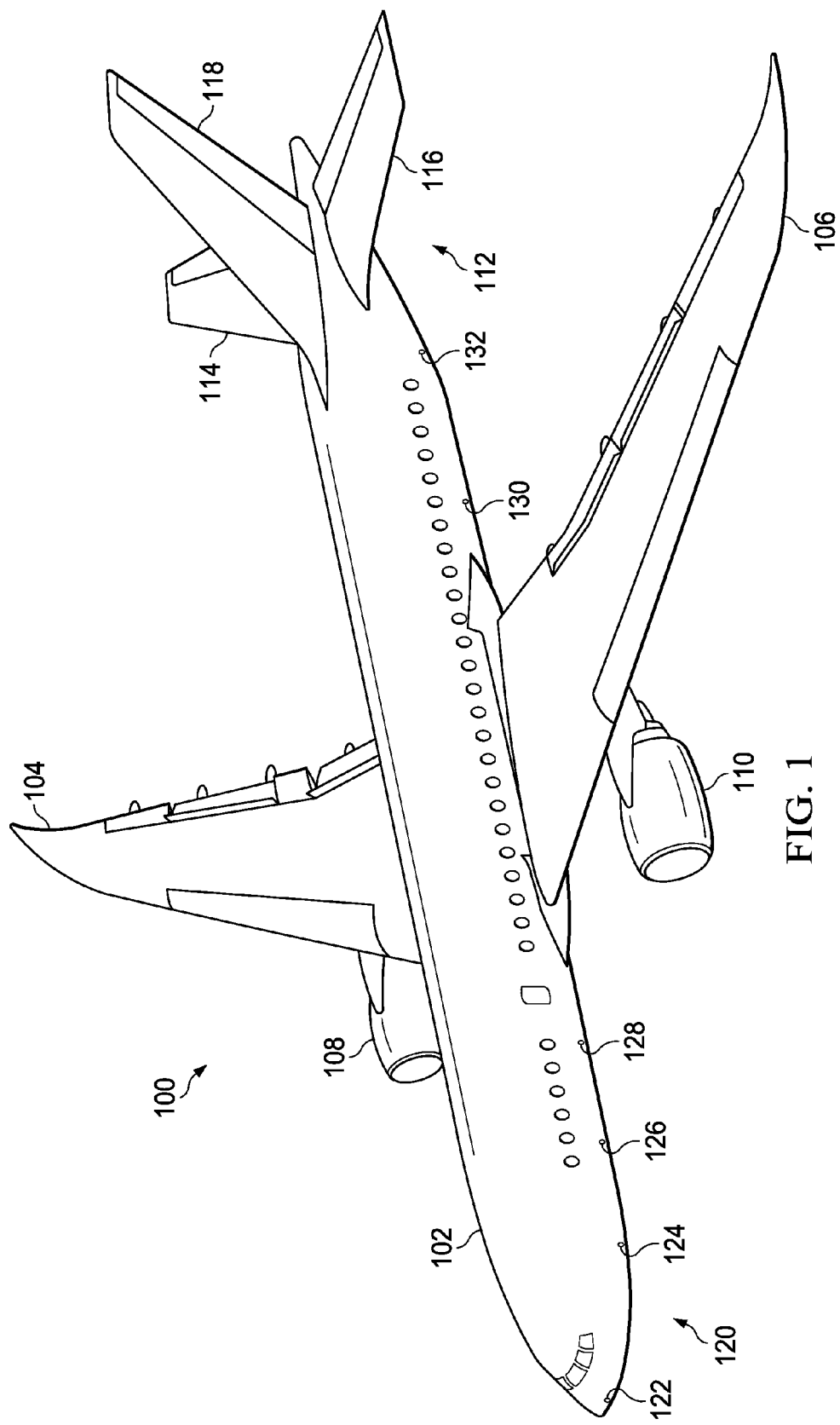
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 includes fuselage 102, wing 104, wing 106, engine 108, engine 110, tail 112, horizontal stabilizer 114, horizontal stabilizer 116, and vertical stabilizer 118.

As depicted, wing 104 and wing 106 are attached to fuselage 102. Engine 108 and engine 110 are attached to wing 104 and wing 106, respectively. Tail 112 is also attached to fuselage 102. In this illustrative example, horizontal stabilizer 114 and horizontal stabilizer 116 are attached to fuselage 102 near tail 112. Further, vertical stabilizer 118 is attached to tail 112.

Aircraft 100 has plurality of pressure taps 120. Plurality of pressure taps 120 include pressure tap 122, pressure tap 124, pressure tap 126, pressure tap 128, pressure tap 130, and pressure tap 132. At least one pressure measurement system uses plurality of pressure taps 120 implemented in accordance with an illustrative embodiment. Plurality of pressure taps 120 is used to measure the static pressure of the air flowing past plurality of pressure taps 120, while aircraft 100 is in flight. An example of one manner in which a pressure measurement system may be implemented is depicted in FIG. 2 below.

In some illustrative examples, aircraft 100 may include other pressures taps in addition to or in place of plurality of pressure taps 120. For example, aircraft 100 may include one or more pressure taps on an interior wall of the cabin inside an aircraft for use in measuring the static pressure of the air flowing within the cabin.

Figure 2:
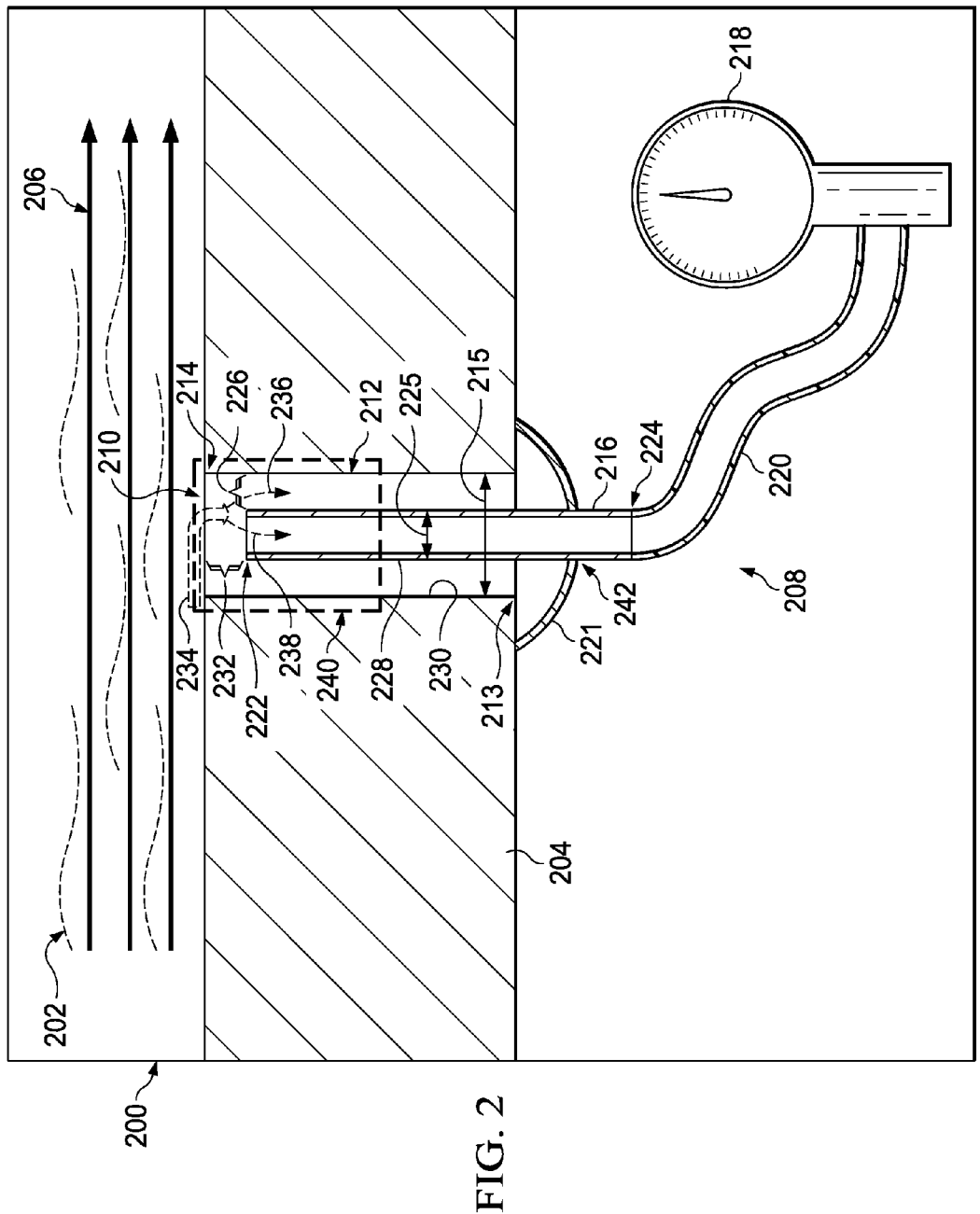
FIG. 2 is an illustration of a fluid environment in accordance with an illustrative embodiment.

With reference now to FIG. 2, an illustration of a fluid environment is depicted in accordance with an illustrative embodiment. In this illustrative example, fluid environment 200 is an environment in which fluid 202 is flowing across structure 204.

As depicted, fluid 202 flows in the direction of arrows 206 across structure 204. In one illustrative example, structure 204 is a panel of fuselage 102 in FIG. 1. A cross-sectional view of structure 204 is shown in this illustrative example. Further, in this example, fluid 202 is air. In other illustrative examples, structure 204 may be some other type of object and fluid 202 may be a liquid or some other type of gas.

Pressure measurement system 208 may be used to measure the static pressure of fluid 202 at location 210. In particular, pressure measurement system 208 uses hole 212 in structure 204 at location 210 to measure the static pressure of fluid 202. Hole 212 has first end 213 and second end 214. Further, hole 212 has hole diameter 215. Hole 212 may also be referred to as a pressure tap or a static port.

In this illustrative example, pressure measurement system 208 includes tube 216, pressure sensor 218, hose 220, and cover 221. In this illustrative example, tube 216 has first end 222 and second end 224. Further, tube 216 has tube diameter 225. Tube diameter 225 is smaller than hole diameter 215.

Pressure sensor 218 is associated with tube 216 through hose 220. As used herein, when one component is "associated" with another component, the association is a physical association in the depicted examples. For example, a first component, such as pressure sensor 218, may be considered to be associated with a second component, such as tube 216, by being at least one of secured to the second component, bonded to the second component, mounted to the second component, welded to the second component, fastened to the second component, or connected to the second component in some other suitable manner.

Further, the first component may be considered to be associated with the second component by being formed as part of the second component, an extension of the second component, or both. Additionally, the first component also may be connected to the second component using one or more other components.

In this illustrative example, pressure sensor 218 is associated with tube 216 by being attached to hose 220, which is attached to second end 224 of tube 216. Tube 216 is a rigid tube and hose 220 is a flexible tube in this illustrative example. However, in other illustrative examples, hose 220 may be replaced by a rigid tube, tube 216 may be a flexible tube, or both. In still other illustrative examples, pressure sensor 218 may be directly attached to second end 224 of tube 216.

As depicted, tube 216 is positioned within hole 212 such that gap 226 is formed between tube 216 and hole 212. In particular, gap 226 is formed when tube 216 is positioned within hole 212 because hole diameter 215 is larger than tube diameter 225. Gap 226 is the space between outer surface 228 of tube 216 and inner wall 230 of hole 212.

In this illustrative example, tube 216 is positioned such that gap 226 has a substantially equal width around tube 216 within hole 212. In other words, tube 216 may be substantially concentric with hole 212. Being substantially concentric with hole 212 means that tube 216 and hole 212 share a same center axis in this illustrative example.

Tube 216 is further positioned within hole 212 such that offset 232 is formed between first end 222 of tube 216 and second end 214 of hole 212. As fluid 202 flows past hole 212, a portion of fluid 202 is deflected into hole 212 through second end 214 of hole 212. As a result, deflected fluid 234 enters hole 212.

First portion 236 of deflected fluid 234 enters and flows within gap 226. Gap 226 keeps first portion 236 of deflected fluid 234 separated from second portion 238 of deflected fluid 234 that enters tube 216 at first end 222 of tube 216.

First portion 236 of deflected fluid 234 that enters gap 226 has a higher total pressure than second portion 238 of deflected fluid 234 that enters tube 216. This higher total pressure is due to a higher dynamic pressure of the first portion of deflected fluid 234 that enters gap 226.

In particular, the dynamic pressure of the second portion of deflected fluid 234 within tube 216 is reduced to zero within selected tolerances. Reducing the dynamic pressure in this manner reduces the bias in the measurement of pressure generated by pressure sensor 218 to zero within selected tolerances. In other words, the pressure measured by pressure sensor 218 reflects substantially only static pressure in this illustrative example.

In this manner, positioning tube 216 within hole 212 such that offset 232 and gap 226 are formed and using tube 216 to measure the static pressure of fluid 202 at location 210 increases the accuracy of the measurements made. An enlarged view of portion 240 of hole 212 and tube 216 is shown in FIG. 3 below.

In this illustrative example, cover 221 is shown covering first end 213 of hole 212. Cover 221 has opening 242 that allows cover 221 to fit around tube 216. In one illustrative example, cover 221 is a suction cup that may be used to cover first end 213 of hole 212, while measurements are taken using pressure sensor 218.

Figure 3:
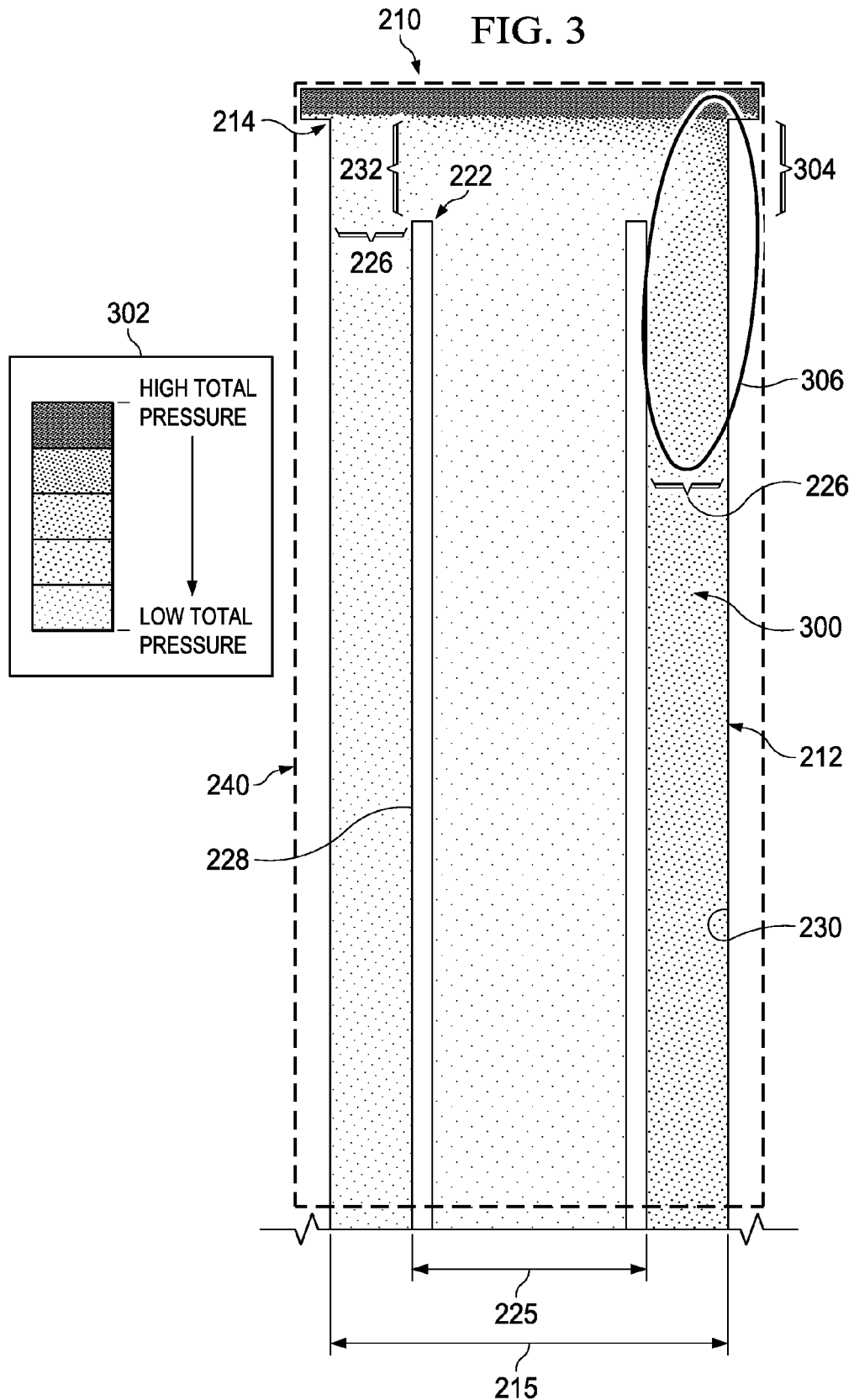
FIG. 3 is an illustration of an enlarged view of a portion of a hole and a tube using a pressure plot in accordance with an illustrative embodiment.

Turning now to FIG. 3, an illustration of an enlarged view of portion 240 of hole 212 and tube 216 from FIG. 2 is depicted using a pressure plot in accordance with an illustrative embodiment. In this illustrative example, pressure plot 300 indicates the total pressure of fluid 202 within hole 212 and tube 216. As illustrated by legend 302, a higher density of dots within pressure plot 300 indicates a higher total pressure and a lower density of dots indicates a lower total pressure.

Shear layer 304 is formed between the flow of fluid 202 passing hole 212 and deflected fluid 234 entering hole 212 in FIG. 2. The different velocities of fluid 202 flowing past hole 212 and deflected fluid 234 cause turbulence near second end 214 of hole 212. Shear layer 304 is the portion of fluid 202 where this turbulence occurs. The distance of offset 232 is selected such that first end 222 of tube 216 is located below shear layer 304. Deflected fluid 234 has a lower total pressure than the portion of fluid 202 flowing past hole 212.

First portion 236 of deflected fluid 234 in FIG. 2 enters and flows within gap 226. As depicted by pressure plot 300, first portion 236 has a higher total pressure than second portion 238 of deflected fluid 234 within tube 216 in FIG. 2. This higher total pressure is due to the higher dynamic pressure of first portion 236 of deflected fluid 234 as compared to second portion 238 of deflected fluid 234. Portion 306 of pressure plot 300 depicts the separation of this higher total pressure portion of deflected fluid 234 from the portion of deflected fluid 234 within tube 216 by gap 226.

The illustrations of aircraft 100 in FIG. 1, fluid environment 200 in FIG. 2, and portion 240 of hole 212 and tube 216 in FIG. 3 are not meant to imply physical or architectural limitations to the manner in which an illustrative embodiment may be implemented. Other components in addition to or in place of the ones illustrated may be used. Some components may be optional.

The different components shown in FIGS. 1-3 may be illustrative examples of how components shown in block form in FIG. 4 below can be implemented as physical structures. Additionally, some of the components in FIGS. 1-3 may be combined with components in FIG. 4, used with components in FIG. 4, or a combination of the two.

For example, although aircraft 100 has been shown having only six pressure taps, aircraft 100 may have an additional six pressure taps on the opposite side of aircraft 100. Further, in other illustrative examples, an attachment device (not shown in FIG. 2) such as, for example, a clamping device, may be used to hold tube 216 in a fixed position relative to hole 212 such that tube 216 is substantially concentric with hole 212.

In other illustrative examples, an attachment device may be used to hold tube 216 in a fixed position relative to hole 212 such that tube is not concentric with hole 212. For example, the attachment device may be used to hold tube 216 in a fixed position relative to hole 212 such that tube 216 is offset from a center axis of hole 212 towards an opposite direction that is opposite to the direction of arrows 206. In other words, tube 216 may be held within hole 212 closer to the location or direction from which fluid 202 is flowing.

Figure 4:
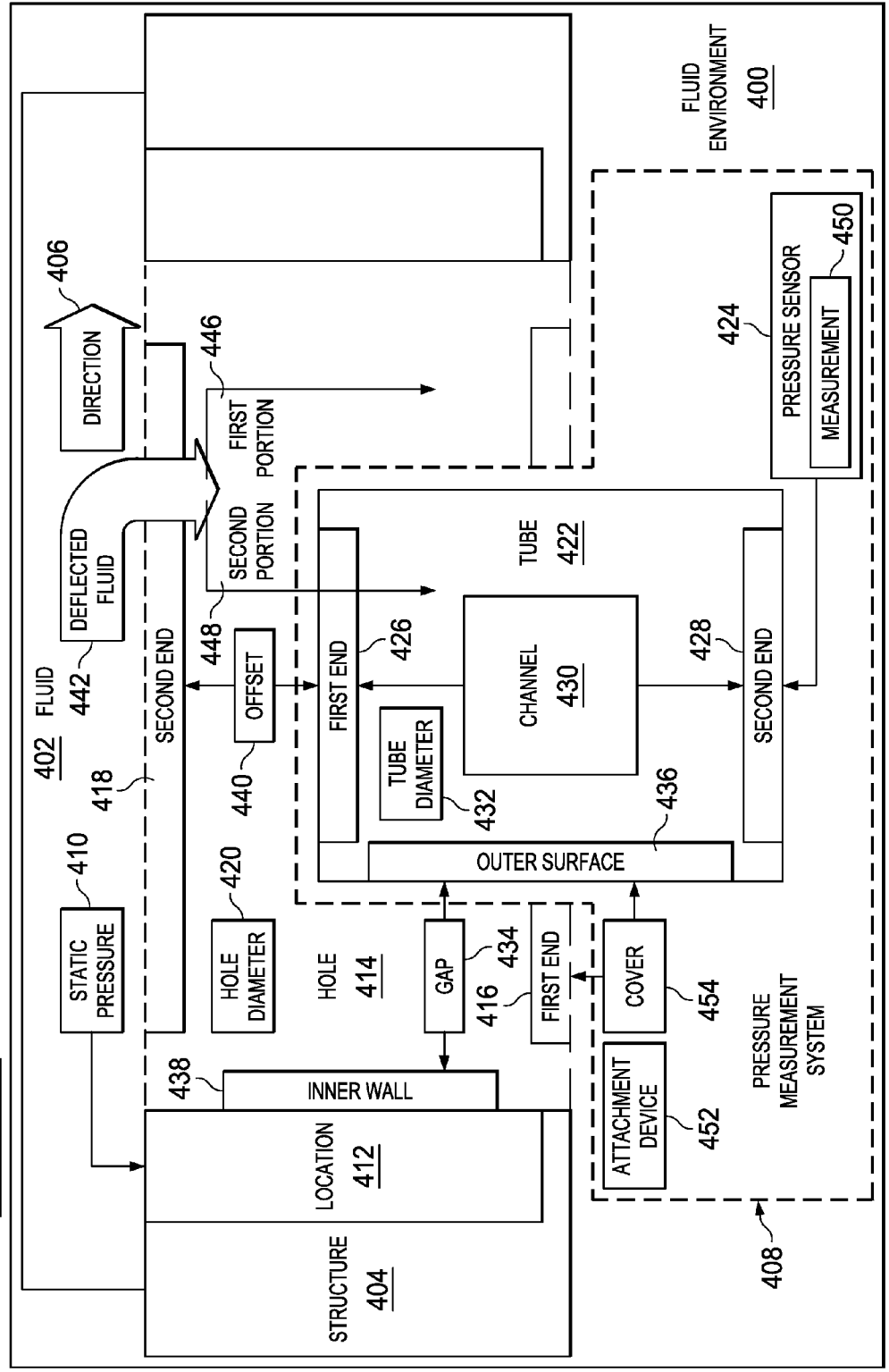
FIG. 4 is an illustration of a fluid environment in the form of a block diagram in accordance with an illustrative embodiment.

With reference now to FIG. 4, an illustration of a fluid environment is depicted in the form of a block diagram in accordance with an illustrative embodiment. In this illustrative example, fluid environment 400 is an environment in which fluid 402 is flowing across structure 404 in direction 406. In this manner, fluid environment 400 is a dynamic fluid environment or dynamic system.

Structure 404 may take a number of different forms, depending on the implementation. For example, structure 404 may take the form of a wing of an aircraft, a fuselage of an aircraft, a skin panel, a door, a fluid duct, a fuel pipe, an air duct, a tube, a hose, a control surface for an aircraft, a wall, a test object, a plate, or some other type of structure. Structure 204 in FIGS. 2-3 is an example of one implementation for structure 404.

Fluid 402 may take the form of a liquid, a gas, or a combination of the two, depending on the implementation. For example, fluid 402 may be comprised of at least one of air, hydraulic liquid, fuel, a gas, or some other type of liquid or gas. Fluid 202 in FIGS. 2-3 is an example of one implementation for fluid 402.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Static pressure 410 of fluid 402 at location 412 on structure 404 may be measured using pressure measurement system 408. Static pressure 410 of fluid 402 at location 412 is the pressure exerted by fluid 402 at location 412 when fluid 402 is at rest. Fluid 402 is at rest when fluid 402 is not moving. In this illustrative example, static pressure 410 of fluid 402 may be a representation of the non-directional molecular motion of fluid 402.

Pressure measurement system 408 is used to measure the static pressure of fluid 402. Pressure measurement system 208 in FIG. 2 is an example of one implementation for pressure measurement system 408.

In this illustrative example, pressure measurement system 408 uses hole 414 in structure 404 at location 412 to measure static pressure 410 of fluid 402 at location 412. Hole 414 has first end 416 and second end 418. Further, hole 414 has hole diameter 420. Hole 414 may also be referred to as a pressure tap or a static port. Each of plurality of pressure taps 120 in FIG. 1 is an example of one implementation for hole 414. Hole 212 in FIGS. 2-3 is an example of one implementation for hole 414.

In this illustrative example, hole 414 is formed such that hole 414 is substantially perpendicular, within selected tolerances, to direction 406 of the flow of fluid 402 across structure 404. In other words, hole 414 is formed such that a center axis through hole 414 is substantially perpendicular to direction 406.

As depicted, pressure measurement system 408 includes tube 422 and pressure sensor 424. Tube 216 and pressure sensor 218 in FIG. 2 are examples of implementations for tube 422 and pressure sensor 424, respectively.

Tube 422 has first end 426 and second end 428. Further, tube 422 has channel 430 that extends from first end 426 to second end 428. Channel 430 is an open channel in that both first end 426 and second end 428 are open ends.

Tube 422 has tube diameter 432. Tube diameter 432 is an outer diameter of tube 422. Tube diameter 432 is smaller than hole diameter 420. When tube 422 is positioned within hole 414, gap 434 is formed between tube 422 and hole 414 because hole diameter 420 is a larger diameter than tube diameter 432. In particular, gap 434 is formed between outer surface 436 of tube 422 and inner wall 438 of hole 414. Gap 226 in FIGS. 2-3 is an example of one implementation for gap 434.

Tube 422 is positioned within hole 414 to measure static pressure 410 of fluid 402 at location 412. In one illustrative example, tube 422 is positioned within hole 414 such that tube 422 is substantially concentric with hole 414. In this manner, gap 434 formed around tube 422 may have a substantially equal width around tube 422. Further, to measure static pressure 410 of fluid 402 at location 412, tube 422 is positioned such that offset 440 is formed between first end 426 of tube 422 and second end 418 of hole 414.

As fluid 402 flows past hole 414, a portion of fluid 402 is deflected into hole 414. This portion of fluid 402 enters hole 414 through second end 418 of hole 414 as deflected fluid 442. Shear layer 444 is formed near the boundary between the portion of fluid 402 flowing past hole 414 and deflected fluid 442. Tube 422 is positioned such that offset 440 ensures that first end 426 of tube 422 is located below shear layer 444.

In this illustrative example, first portion 446 of deflected fluid 442 is the portion of deflected fluid 442 within the area of offset 440 and within gap 434. Second portion 448 of deflected fluid 442 is the portion of deflected fluid 442 within channel 430 of tube 422.

The total pressure of first portion 446 is higher than the total pressure of second portion 448 because the dynamic pressure of first portion 446 is higher than the dynamic pressure of second portion 448. However, the static pressure of both first portion 446 and second portion 448 may be substantially equal, within selected tolerances.

In this manner, gap 434 allows the higher total pressure of first portion 446 of deflected fluid 442 to be separated from second portion 448 of deflected fluid 442 within tube 422. Gap 434 may also be referred to as a trap. In this illustrative example, the dynamic pressure of second portion 448 may be reduced to zero within selected tolerances.

Pressure sensor 424 is associated with tube 422. In this illustrative example, pressure sensor 424 is associated with second end 428 of tube 422. Pressure sensor 424 is used to measure the total pressure of second portion 448 of deflected fluid 442 within tube 422.

For example, pressure sensor 424 may generate measurement 450 of the total pressure of second portion 448 of deflected fluid 442 within tube 422. Because the dynamic pressure of second portion 448 is reduced to zero within selected tolerances, measurement 450 includes substantially only static pressure. Thus, measurement 450 may be a measure of static pressure 410 of fluid 402 at location 412 with any bias due to dynamic pressure reduced to zero within selected tolerances.

In this illustrative example, pressure measurement system 408 may also include attachment device 452, cover 454, or both. Attachment device 452 may be used to hold tube 422 in a fixed position relative to structure 404 and hole 414, while measurements are being generated by pressure sensor 424. Attachment device 452 may take the form of a clamping device, a fastening device, or some other type of mechanism capable of holding tube 422 in a fixed position relative to structure 404 and hole 414.

Cover 454 may be used to cover first end 416 of hole 414, while measurements are being generated by pressure sensor 424. Cover 221 in FIG. 2 is an example of one implementation for cover 454.

The illustration of fluid environment 400 in FIG. 4 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, attachment device 452 and cover 454 may be used but not considered part of pressure measurement system 408. In some illustrative examples, tube diameter 432 may vary along a center axis of tube 422. In other illustrative examples, hole diameter 420 may vary along a center axis of hole 414. However, tube diameter 432 and hole diameter 420 may be substantially constant for at least a selected distance from first end 426 of tube 422 and second end 418 of hole 414, respectively.

With reference now to FIG. 5, an illustration of a process for measuring static pressure is depicted in the form of a flowchart in accordance with an illustrative embodiment. The process illustrated in FIG. 5 may be implemented using pressure measurement system 408 in FIG. 4.

The process begins by positioning a tube within a hole in a structure having a hole diameter that is larger than a tube diameter of the tube such that a gap is formed between the tube and the hole and such that a first portion of deflected fluid that is deflected from a flow of fluid passing over the hole enters the gap and a second portion of the deflected fluid enters the tube (operation 500). In one illustrative example, the tube is positioned within the hole in operation 500 such that the tube is substantially concentric with the hole.

Thereafter, a static pressure of the fluid at a location of the hole is measured using the second portion of the deflected fluid in the tube with the tube positioned within the hole (operation 502), with the process terminating thereafter. The measured static pressure in operation 502 has a desired level of accuracy. In particular, bias in the measured static pressure is reduced to below a selected threshold because the gap between the tube and the hole allows substantially the entire portion of the deflected fluid having a dynamic pressure above a selected threshold to be isolated from the tube. The selected threshold for the dynamic pressure may be, for example, about zero.

With reference now to FIG. 6, an illustration of a process for measuring static pressure is depicted in the form of a flowchart in accordance with an illustrative embodiment. The process illustrated in FIG. 5 may be implemented using pressure measurement system 408 in FIG. 4.

The process begins by placing a tube within a hole in a structure in which the tube has a tube diameter that is smaller than a hole diameter of the hole such that a gap is formed between the tube and the hole (operation 600). Next, the tube is positioned within the hole such that an offset is formed between an end of the tube and an end of the hole such that the end of the tube is located below a shear layer formed near a boundary between a fluid flowing past the hole and a portion of the fluid that is deflected into the hole (operation 602).

A first portion of the deflected fluid that enters the gap between the tube and the hole is separated from a second portion of the deflected fluid that enters the tube such that a dynamic pressure of the second portion of the deflected fluid is reduced to zero within selected tolerances (operation 604). A total pressure of the second portion of the deflected fluid within the tube is measured using a pressure sensor in which the total pressure measured substantially only includes static pressure (operation 606), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in the form of a block diagram in accordance with an illustrative embodiment. Aircraft manufacturing and service method 700 may be used to manufacture an aircraft, such as aircraft 800 in FIG. 8 below or aircraft 100 in FIG. 1 above.

During pre-production, aircraft manufacturing and service method 700 may include specification and design 702 of aircraft 800 in FIG. 8 and material procurement 704. During production, component and subassembly manufacturing 706 and system integration 708 of aircraft 800 in FIG. 8 takes place.

Thereafter, aircraft 800 in FIG. 8 may go through certification and delivery 710 in order to be placed in service 712. While in service 712 by a customer, aircraft 800 in FIG. 8 is scheduled for maintenance and service 714, which may include modification, reconfiguration, refurbishment, and other maintenance or service.

Each of the processes of aircraft manufacturing and service method 700 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in the form of a block diagram in which an illustrative embodiment may be implemented. In this example, aircraft 800 is produced by aircraft manufacturing and service method 700 in FIG. 7. Aircraft 100 in FIG. 1 is an example of one implementation for aircraft 800.

As depicted, aircraft 800 includes airframe 802. Airframe 802 is the mechanical structure of aircraft 800 and typically includes the fuselage, wings, tail, and undercarriage of aircraft 800.

Aircraft 800 also includes number of systems 804 and interior 806. As used herein, a "number of" includes one or more items. In this manner, number of systems 804 may include one or more systems. Number of systems 804 may include, for example, without limitation, at least one of propulsion system 808, electrical system 810, hydraulic system 812, environmental system 814, or any number of other types of systems.

Apparatuses and methods embodied herein may be employed during at least one of the stages of aircraft manufacturing and service method 700 in FIG. 7. In particular, pressure measurement system 408 from FIG. 4 may be used to measure static pressure during any one of the stages of aircraft manufacturing and service method 700. For example, without limitation, pressure measurement system 408 from FIG. 4 may be used to measure static pressure during at least one of component and subassembly manufacturing 706, system integration 708, certification and delivery 710, in service 712, maintenance and service 714, or some other stage of aircraft manufacturing and service method 700.

Further, pressure measurement system 408 from FIG. 4 may use pressure taps in aircraft 800 to measure static pressure. These pressure taps may be located in, for example, airframe 802 of aircraft 800.

Although an aerospace example is shown, different illustrative embodiments may be applied to other industries, such as the automotive industry. Depending on the implementation, pressure measurement system 408 from FIG. 4 may be used to measure the static pressure of fluid at certain locations along a ship, a spacecraft, a ground vehicle, a building, a test object, or some other type of structure. The methods for measuring static pressure described in FIGS. 5-6 may be used to increase the accuracy with which static pressure is measured.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for measuring static pressure, the method comprising:
  positioning a tube within a hole in a structure in which the hole has a hole diameter that is larger than a tube diameter of the tube such that a gap is formed between the tube and the hole and such that a first portion of deflected fluid that is deflected from a flow of fluid passing over the hole enters the gap and a second portion of the deflected fluid enters the tube, wherein positioning includes positioning the tube within the hole such that an offset is formed between an end of the tube and an end of the hole and the end of the tube is located below a shear layer formed near a boundary between the fluid flowing past the hole and the deflected fluid; and measuring the static pressure of the fluid at a location of the hole with the tube positioned within the hole.

2. The method of claim 1 further comprising:
separating a higher total pressure portion of the deflected fluid within the gap from a portion of the deflected fluid within the tube, wherein a dynamic pressure of the portion of the deflected fluid within the tube is reduced to zero within selected tolerances.

3. The method of claim 1 further comprising:
holding the tube in a fixed position relative to the hole using an attachment device such that the tube is substantially concentric with the hole.

4. The method of claim 1 further comprising:
holding the tube in a fixed position relative to the hole using an attachment device such that the tube is offset from a center axis of the hole towards an opposite direction that is opposite to a direction of the flow of the fluid.

5. A pressure measurement system comprising:
a tube having a tube diameter that is smaller than a hole diameter of a hole in a structure such that a gap is formed between the tube and the hole when the tube is positioned within the hole, wherein the hole has a first end and a second end;
a pressure sensor associated with the tube and configured to measure a static pressure of a fluid flowing across the structure at a location of the hole; and
a cover configured to cover the first end of the hole when the pressure sensor is used to measure the static pressure of the fluid.

6. The pressure measurement system of claim 5, wherein the hole is a pressure tap.

7. The pressure measurement system of claim 5, wherein the tube is positioned within the hole such that an offset is formed between an end of the tube and an end of the hole.

8. The pressure measurement system of claim 7, wherein the offset is selected such that the end of the tube is located below a shear layer formed near a boundary between the fluid flowing past the hole and a portion of the fluid that is deflected into the hole as deflected fluid.

9. The pressure measurement system of claim 5, wherein a portion of the fluid that flows past the hole is deflected into the hole as deflected fluid and wherein a first portion of the deflected fluid enters the gap and a second portion of the deflected fluid enters the tube.

10. The pressure measurement system of claim 9, wherein the first portion of the deflected fluid has a higher total pressure than the second portion of the deflected fluid because the first portion of the deflected fluid has a higher dynamic pressure than the second portion of the deflected fluid.

11. The pressure measurement system of claim 9, wherein a dynamic pressure of the second portion of the deflected fluid within the tube is reduced to zero within selected tolerances.

12. The pressure measurement system of claim 5 further comprising:
an attachment device configured to hold the tube in a fixed position relative to the hole.

13. The pressure measurement system of claim 12, wherein the attachment device is configured to hold the tube in the fixed position relative to the hole such that the tube is substantially concentric with the hole.

14. A pressure measurement system comprising:
a tube having a tube diameter that is smaller than a hole diameter of a hole in a structure such that a gap is formed between the tube and the hole when the tube is positioned within the hole, wherein the tube is positioned within the hole such that an offset is formed between an end of the tube and an end of the hole, and wherein the offset is selected such that the end of the tube is located below a shear layer formed near a boundary between the fluid flowing past the hole and a portion of the fluid that is deflected into the hole as deflected fluid; and
a pressure sensor associated with the tube and configured to measure a static pressure of a fluid flowing across the structure at a location of the hole.

15. The pressure measurement system of claim 14, wherein the hole is a pressure tap.

16. The pressure measurement system of claim 14, wherein a portion of the fluid that flows past the hole is deflected into the hole as deflected fluid and wherein a first portion of the deflected fluid enters the gap and a second portion of the deflected fluid enters the tube.

17. The pressure measurement system of claim 16, wherein the first portion of the deflected fluid has a higher total pressure than the second portion of the deflected fluid because the first portion of the deflected fluid has a higher dynamic pressure than the second portion of the deflected fluid.

18. The pressure measurement system of claim 16, wherein a dynamic pressure of the second portion of the deflected fluid within the tube is reduced to zero within selected tolerances.

19. The pressure measurement system of claim 14, wherein the hole has a first end and a second end and further comprising:
a cover configured to cover the first end of the hole when the pressure sensor is used to measure the static pressure of the fluid.

20. The pressure measurement system of claim 14 further comprising:
an attachment device configured to hold the tube in a fixed position relative to the hole, wherein the attachment device is configured to hold the tube in the fixed position relative to the hole such that the tube is substantially concentric with the hole.

* * * * *